United States Patent
Cowick

(10) Patent No.: US 9,253,333 B1
(45) Date of Patent: Feb. 2, 2016

(54) VOICE OVER PACKET (VOP) CALL DETAIL RECORDING (CDR)

(75) Inventor: Dennis E. Cowick, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 2487 days.

(21) Appl. No.: 11/424,945

(22) Filed: Jun. 19, 2006

(51) Int. Cl.
*H04M 11/00* (2006.01)
*H04M 15/00* (2006.01)

(52) U.S. Cl.
CPC .............. *H04M 15/41* (2013.01); *H04M 15/80* (2013.01)

(58) Field of Classification Search
CPC ........ H04W 24/08; H04W 4/24; H04L 67/22; H04M 15/00; H04M 15/41; H04M 15/55; H04M 15/56; H04M 15/62; H04M 2215/0164; H04M 2215/2046; H04M 15/42; H04M 15/43; H04M 15/52; H04M 15/67; H04M 15/80
USPC .............. 370/256, 352; 709/204; 379/112.09, 379/114.01, 126
See application file for complete search history.

(56) References Cited

U.S. PATENT DOCUMENTS

| | | | |
|---|---|---|---|
| 2002/0176547 A1* | 11/2002 | Jones | 379/88.17 |
| 2003/0187800 A1* | 10/2003 | Moore et al. | 705/52 |
| 2004/0019700 A1* | 1/2004 | Ilan et al. | 709/249 |
| 2004/0059815 A1* | 3/2004 | Buckingham et al. | 709/224 |
| 2004/0125755 A1* | 7/2004 | Roberts | 370/259 |
| 2004/0202145 A1* | 10/2004 | Lundin | 370/349 |
| 2005/0105465 A1* | 5/2005 | Eriksson | 370/229 |
| 2005/0154736 A1* | 7/2005 | Meikleham et al. | 707/10 |
| 2006/0069726 A1* | 3/2006 | McKibben et al. | 709/204 |
| 2006/0079228 A1* | 4/2006 | Marsico et al. | 455/433 |
| 2006/0285650 A1* | 12/2006 | Hodge | 379/32.01 |
| 2008/0212573 A1* | 9/2008 | Noldus et al. | 370/355 |

* cited by examiner

*Primary Examiner* — Melanie Jagannathan
*Assistant Examiner* — Najeebuddin Ansari

(57) ABSTRACT

A method, system, and medium are provided for recording VOP calls at a premise to perform real-time processing of the VOP calls, charging for VOP calls at a premise with multiple users, and collecting call information in a VOP network. A call detail recording (CDR) device resides at a hotel, motel, or lodge premise to record telephone calls and set telephone charges of the guests staying at the hotel, motel, or lodge. The CDR device is not a PBX but allows a premise owner to control and provide real-time charges to users of services in a packet-based network at the hotel, motel, or lodge.

13 Claims, 5 Drawing Sheets

VOICE OVER PACKET (VOP) CALL DETAIL RECORDING (CDR)

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Many years ago, the hospitality industry developed a plan that would enable them to charge customers for telephone calls when the customers were staying at their place of business. This plan included systems of various types. One system included a private branch exchange (PBX) connected to other telephone switches in a circuit-based network. The PBX would reside on the premise of the hotel, motel, or lodge to provide telephone service to the guests that stayed on the premise. The PBX would collect billing information for various types of telephone calls made by the guests to enable the business to present a telephone bill to the guest upon completion of the guest's stay.

Another system developed by the hospitality industry involved having a telephone switch operated by a service provider collect and manage telephone traffic associated with customers staying at the hotel, motel, or lodge. Again, the telephone switch was in a circuit-based network. The telephone switch might have one or more adjunct devices to support it that would operate to keep track of the telephone charges from the specific hotel, motel, or lodge. With this system, the hotel, motel, or lodge could have all of its telephone lines connect to the telephone switch or could have a concentrating device multiplex the lines onto trunks that connected to the telephone switch.

In either case of the PBX or the directly-connected premise lines to the telephone switch, applications handled billing data in a circuit-based network. Many of the applications included and still do include station message-detail recording (SMDR). Unfortunately, businesses like hotels, motels, or lodges would like call detail recording in a packet-based network in a real-time basis, but without having to expend funds for a PBX. They would also like to control and manage CDRs from their customers' (guests) phone usage rather than obtain this data or a portion thereof from a service provider that stores and manages CDRs at a central office containing a telephone switch. Therefore, a solution is needed that provides a CDR device that resides at a premise such as a hotel, a motel, or a lodge which is not a PBX. The CDR device should record telephone calls and set telephone charges of the guests staying at the hotel, motel, or lodge.

SUMMARY

The presenting invention is defined by the claims below. Embodiments of the present invention solve at least the above problems by providing a system and method for, among other things, recording VOP calls at a premise to perform real-time processing of the VOP calls, charging for VOP calls at a premise with multiple users, and collecting call information in a VOP network.

In a first aspect, a system for recording voice over packet (VOP) calls at a premise to perform real-time processing of the VOP calls is provided that includes a call detailing recording (CDR) device connected to users at the premise and a VOP network. The CDR device is not a PBX. The CDR device is located between the users and the VOP network, and the CDR device is located in proximity to the users. The CDR device operates to collect information associated with VOP calls made by the users. The CDR device operates to apply tariffs rates to the VOP calls. The CDR device operates to either provide data associated with the VOP calls to a billing system, print the data about the VOP calls, or generate bills for telephone charges based on the VOP calls and the tariffs rates.

In another aspect, a computer system having a processor and a memory for executing a method for charging for VOP calls at a premise with multiple users is provided that includes monitoring telephone calls at a computing device, at the premise with users, with a connection to a switch in a VOP network. The computing device is not a PBX. Tariffs are applied to the telephone calls. The tariffs are preprogrammed and the tariffs vary according to either a length of time of a call, a distance from a calling party to a called party, or a type of call. At the computing device, either bills for telephone charges associated with the telephone calls are generated, information associated with the telephone calls is provided to a billing system, or information about the set of telephone calls is printed.

In yet another aspect, a CDR device for collecting call information in a VOP network is provided that includes a processor, memory, storage device, and computer applications operating together in the CDR device. The CDR device is not a PBX. The processor, memory, storage device, and computer applications operate to collect call information from users engaged in telephone conversations located at a premise. The processor, memory, storage device, and computer applications also operate to monitor telephone calls between the users and other parties. The storage device operates to store either call information, other information associated with telephone calls made by the users, or telephone charges. The computer applications operate to set tariff rates, apply the tariff rates to the telephone calls, and create the telephone charges.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
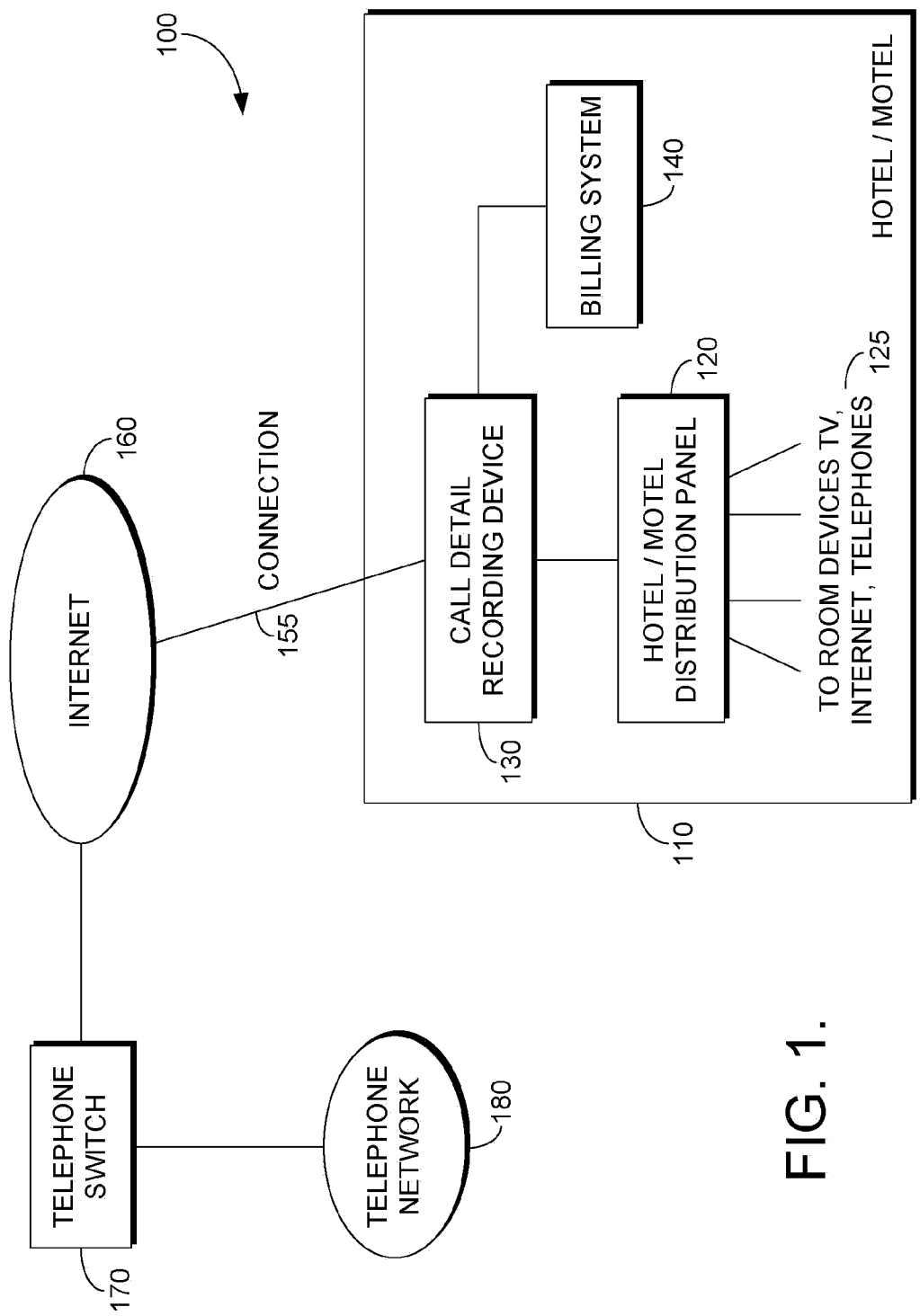
FIG. 1 is a block diagram of an exemplary operating environment illustrating a CDR device in a hospitality environment.

Embodiments of the present invention provide systems and methods for a call detail recording (CDR) device that resides at a hotel, motel, or lodge premise to record telephone calls and set telephone charges of the guests staying at the hotel, motel, or lodge premise.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

CDR Call Detail Record or Call Detail Recording
COAX Coaxial Cable
LAN Local Area Network
PBX Private Branch Exchange
PSTN Public Switched Telephone Network
RAM Random Access Memory
ROM Read-Only Memory
SMDR Station Message-Detail Recording
VOIP Voice over Internet Protocol
VOP Voice over Packet
WiFi Wireless Fidelity (802.11 network)
WiMAX Worldwide Interoperability for Wireless Access (802.16 network)

Further, various technical terms are used throughout this description. A definition of such terms can be found in *Newton's Telecom Dictionary* by H. Newton, $21^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

CDR Device for VOP Calls

A desire of businesses in the hospitality industry would be to manage CDRs for their guests if they migrate to a packet-based network and provide VOP service. Businesses do not want their CDRs stored and managed at a central office under the control of a service provider. Furthermore, businesses want to generate real-time bills for telephone charges resulting from their guest's telephone usage but without using a PBX. Embodiments of the present invention allow businesses to use a CDR device to accomplish the above-mentioned tasks. The CDR device can reside on the business' premise to collect various information pertaining to telephone calls.

In FIG. 1, an operating environment 100 is shown with a hotel premise 110 connected through CDR device 130 via 155 to the Internet 160. A telephone switch 170 is also connected to the Internet 160 and is connected to telephone network 180. Within hotel premise 110, the hotel's distribution panel is represented by panel 120. Panel 120 connects guest rooms 125 to CDR device 130. CDR device 130 connects to billing system 140.

Premise 110 shows a hotel but may also represent any hospitality environment or other environment comprising a set of users. In the hospitality environment, premise 110 may be a hotel, motel, lodge, or resort, but is not limited to these environments only. Premise 110 may also be a college campus, office building, or other establishment where a group of users may use telephone service and be required to pay for those services after a period of time.

Panel 120 represents a telephone distribution panel that may be found with telephone equipment. The phone lines that are located in guest rooms 125 are usually bundled together or meet up at a particular point at their opposite end. This point is usually the distribution panel or distribution frame. Panel 120 represents the termination point for telephone lines identified as guest rooms 125. Although the term telephone lines is used, in the context here, telephone lines may represent internet connections, packet connections, or asynchronous data transfers for devices such as televisions, computing devices, and telephones.

Once the telephone lines terminate at panel 120, additional connections are made to CDR device 130 allowing the lines of guest rooms 125 to reach and pass through CDR device 130. CDR device 130 provides an interface to a VOP network identified by a connection to Internet 160. The connections between CDR 130 and the Internet 160 may vary depending a variety of factors including the type of service providers that may provide network access. For example, if the service provider is a cable company, the connection 155 may be a COAX cable. If the service provider is a telephone company, the connection 155 may be twisted pair cable. The idea here is to show that CDR device 130 has a packet-based connection to the Internet 160 for telephone, internet, and data service.

In one embodiment of the present invention, CDR device 130 connects to billing system 140. This illustration shows the capability of CDR device 130 to collect certain data associated with telephone service and transfer that data to billing system 140 for further processing. In an interactive session, billing system 140 may also provide inputs to CDR device 130. For example, tariff rates may be established directly at CDR device 130, through billing system 140 with inputs to CDR device 130, or through another remote device which is not shown.

In order for telephone service to occur at premise 110, telephone switch 170 must be involved. In an embodiment of the present invention, guest rooms 125 have ten-digit dialing (ability to dial beyond the premise) indicating that each telephone line from guest rooms 125 has a direct connection to telephone switch 170. Telephone switch 170 connects to telephone network 180 enabling customers in guest rooms 125 to reach other parties or locations.

Although not shown, the Internet 160, telephone switch 170, and telephone network 180 may be considered part of a voice over packet (VOP) network. The VOP network is a packet-based network as opposed to a circuit-based network like the PSTN. A VOP network may include, but not be limited to, voice over internet protocol (VOIP), voice over asynchronous transfer mode (ATM), voice over frame relay, and voice over wireless local area network (LAN) including voice over WiFi and voice over WiMAX. However, telephone switch 170 and telephone network 180 can still be part of a circuit-based network although premise 110 is connected to a packet-based network. The conversion aspects between the circuit-based network and packet-based network are not considered here. One ordinarily skilled in the art understands that the conversion may occur in telephone switch 170 or such other devices that are not shown here.

Figure 2:
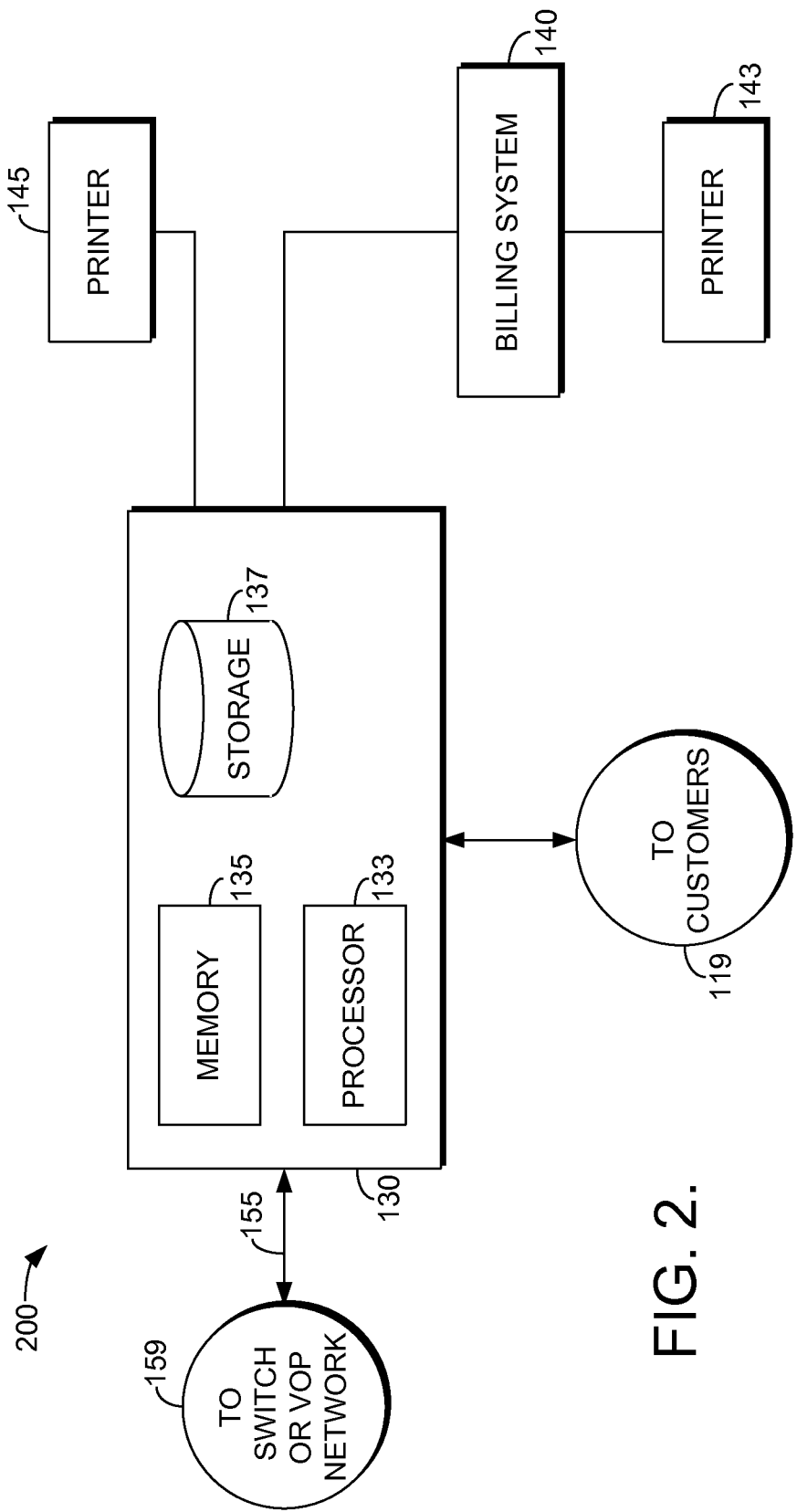
FIG. 2 is a block diagram of an exemplary CDR device implemented in an embodiment of the present invention.

Turning now to FIG. 2, an exemplary component view 200 is shown with CDR device 130 connected to customers 119 and switch or VOP network 159. Customers 119 represent the connection to panel 120 identified in FIG. 1 which leads to guest rooms 125. The switch or VOP network 159 represent the connection between CDR device 130 and the Internet 160 in FIG. 1.

In FIG. 2, a more detailed view of CDR device 130 is shown connected to various devices to illustrate the various embodiments that may be implemented when practicing the present invention. CDR device 130 may have a connection to billing system 140 as discussed in FIG. 1. CDR device 130 may have a connection to a printer 145. Another embodiment may show billing system 140 with a printer 143.

Within CDR device 130, a processor 133, a memory 135, a storage device 137, and applications 139 are shown. These exemplary components within CDR device 130 may vary depending on the implementation of the embodiment. For example, multiple versions of the identified components may exist in CDR device 130. In addition, components, not shown, may be included in the implementation of CDR device 130 such as a keyboard or a video display. The idea here is to illustrate that CDR device 130 is a computing device.

Storage device 137 may be implemented to store a variety of information. Storage device 137 may be a flash memory, RAM or ROM, but it may also be a disk drive or a tape unit. Storage device 137 may collect call information from the calling activities occurring between guest rooms 125 and other parties. Storage device 137 may hold tariff rates that vary depending on the length of the call, the distance between parties, and the type of call. For example, a tariff rate may depend on the duration of the call. A charge for a call under five (5) minutes may be considerably less than a call lasting two (2) hours. Also, a larger tariff rate may be imposed for a call between parties located in New York and Los Angeles as opposed to a call between parties located in New York and Philadelphia. Furthermore, a tariff rate may be different for an 800 call as compared to a direct-dialed call.

One of the benefits of a locally-placed CDR device 130 is that an owner has control over the disposition of the information in CDR device 130. For example, rather than a service provider controlling the tariff rates, the owner controls the tariff rates and may operate without the same regulatory measures that may be imposed on the service provider. Therefore, the tariff rates identified above may be changed more frequently or may be significantly higher than those that might be encountered from the service provider.

Figure 3:
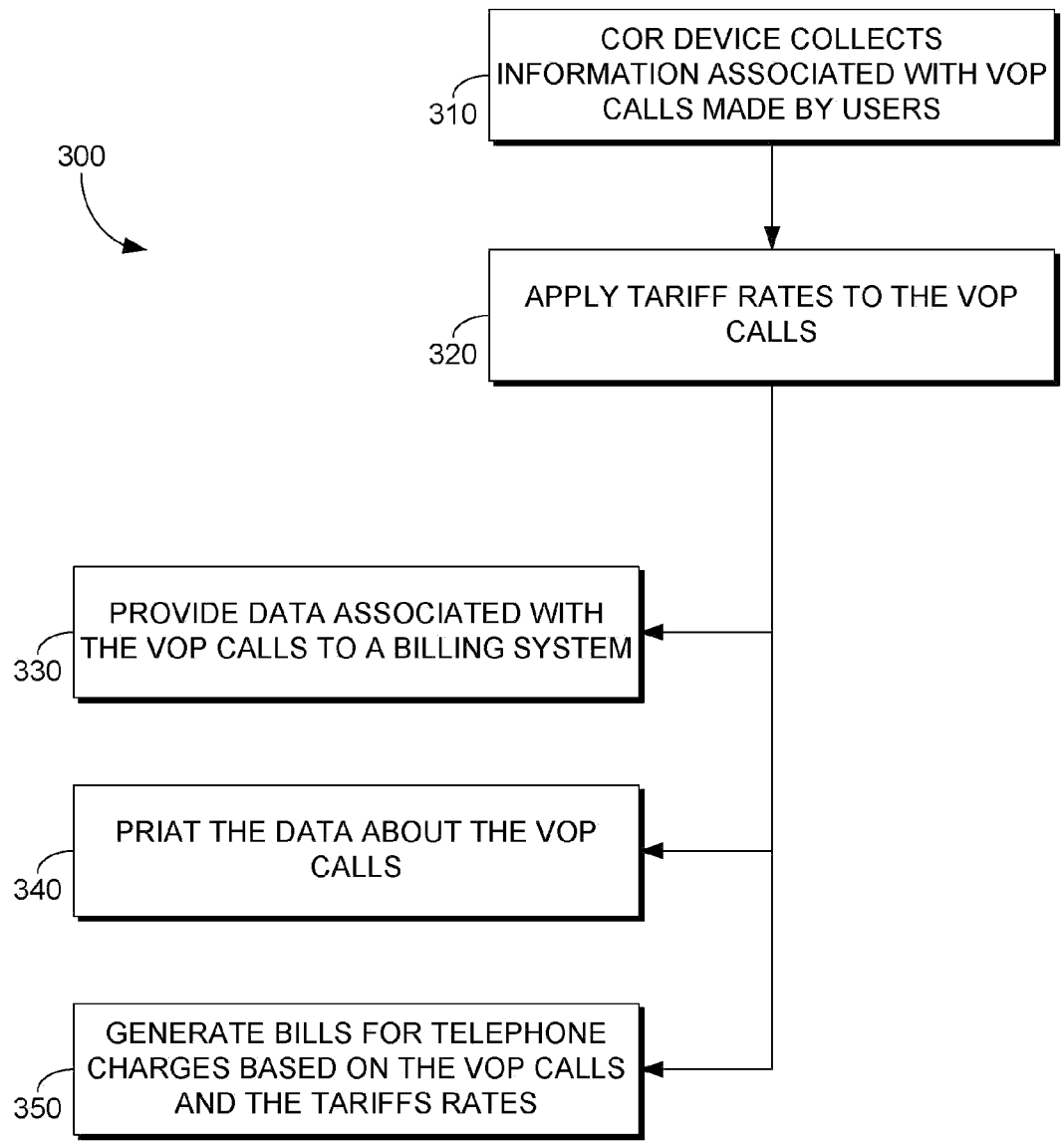
FIG. 3 is a flowchart of an exemplary process for recording VOP calls at a premise when implementing an embodiment of the present invention.

Continuing with FIG. 3, applications 130 represent the computer software that may operate in CDR device 130. Applications 139 may include various computer software programs that operate with different tasks. For example, applications 139 may calculate the charges for guest rooms 125 using information stored in storage device 137 or collected elsewhere. Applications 139 may be responsible for collecting call information such as SMDR. Applications 139 may enable printing or may transfer data to other systems like billing system 140. The scope of functions for applications 139 is unlimited and may vary according to the implementation of the embodiment of the present invention. However, it is understood that CDR device 130 does not function as a PBX.

In FIG. 3, a process for recording VOP calls at a premise is shown in a method 300. Method 300 illustrates the collection aspect of CDR device 130. CDR device 130 is located between users and the VOP network to monitor, capture, or collect information among other things. In a step 310, CDR device 130 collects information associated with VOP calls made by users in guest rooms 125. In a step 320, tariff rates are applied to the VOP calls in CDR device 130. In a step 330, data associated with the VOP calls are provided from CDR device 130 to billing system 140. In a step 340, data about the VOP calls is printed at CDR device 130. In a step 350, bills for telephone charges are generated based on the VOP calls and the tariffs rates.

Figure 4:
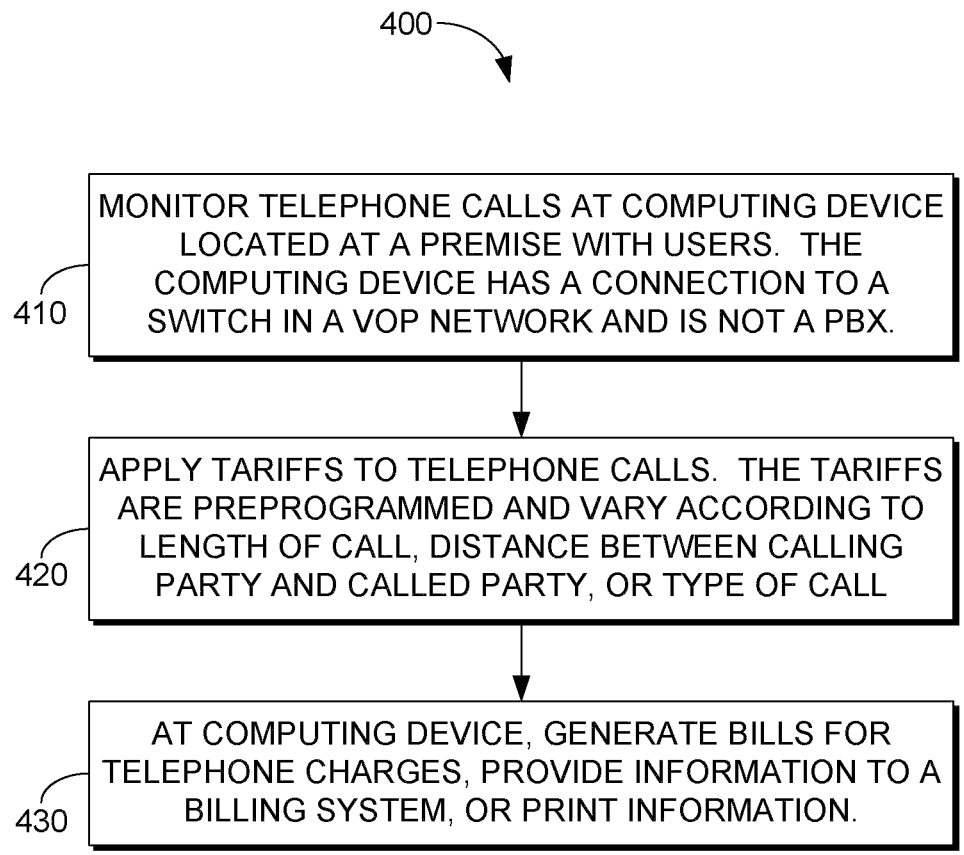
FIG. 4 is a flowchart of an exemplary process for charging for VOP calls at a premise when implementing an embodiment of the present invention.

In FIG. 4 a process for charging for VOP calls at a premise is shown in a method 400. In a step 410, telephone calls are monitored at a computing device (CDR device 130) located at premise 110 with users (guest rooms 125). The computing device has a connection to telephone switch 170 in a VOP network (the Internet 160 and telephone network 180) and is not a PBX. In a step 420, tariffs are applied to the telephone calls. The tariffs are preprogrammed and vary according to the length of the call, the distance between parties, or the type of the call. The tariffs were discussed above in FIG. 2. In a step 430, at the computing device, bills may be generated for the telephone charges, information may be provided to billing system 140, or information may be printed at printers 143 or 145.

Figure 5:
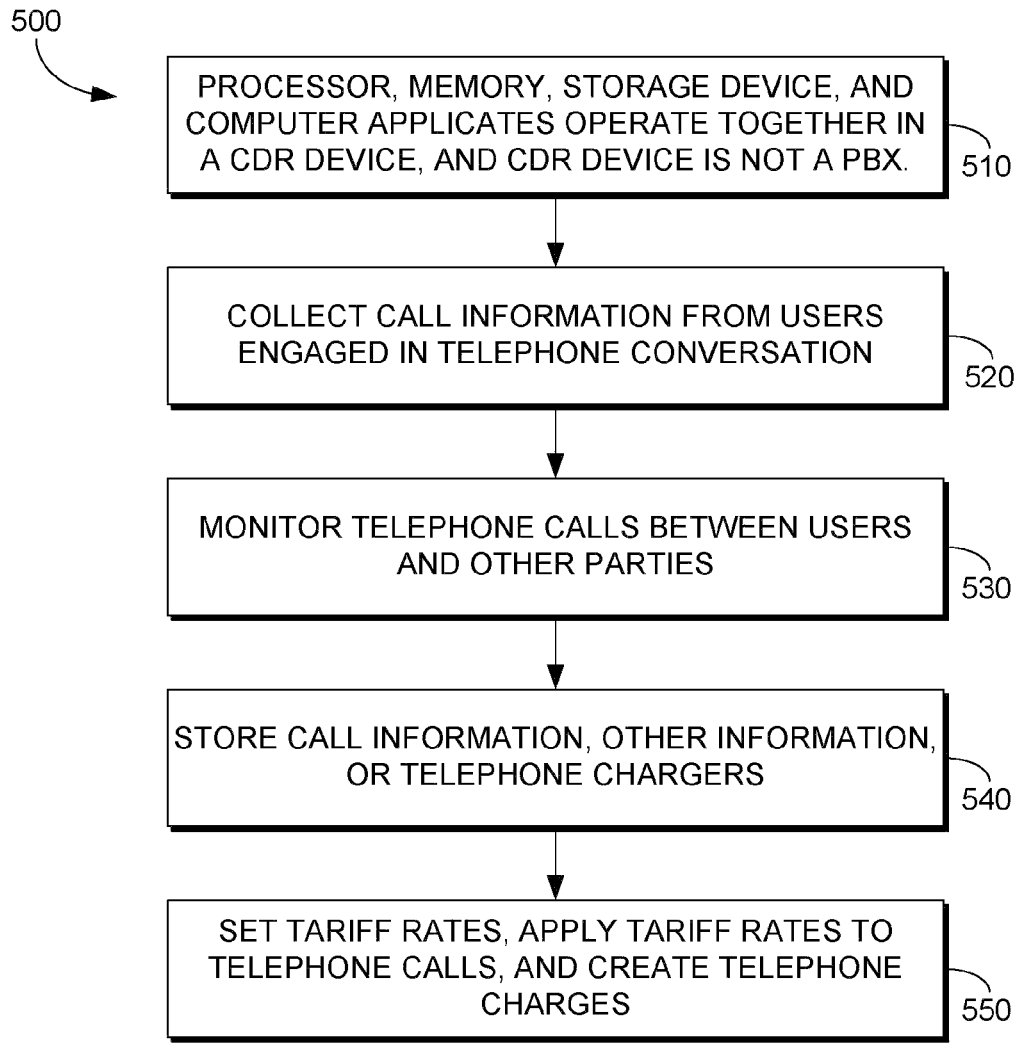
FIG. 5 is a flowchart of an exemplary process for collecting call information in a VOP network when implementing an embodiment of the present invention.

In FIG. 5, a process for collecting call information in a VOP network is shown in a method 500. In a step 510, CDR device 130 has processor 133, memory 135, storage device 137, and computer applications 139 that operate together. CDR device 130 is not a PBX. In a step 520, call information is collected from users (guest rooms 125) engaged in telephone conversations. In a step 530, telephone calls are monitored between the users and other parties. Other parties represent people and locations found in the Internet 160, connected to telephone switch 170, or connected to telephone network 180. In a step 540, call information between the users and other parties, other information that may or may not be related to calls, and telephone charges are stored in storage device 137. In a step 550, tariff rates may be determined. Tariff rates may be applied to the telephone calls. Telephone charges may be created.

The prior discussion is only for illustrative purposes to convey exemplary embodiments. The steps discussed in FIGS. 3, 4 and 5 may be executed without regards to order. Some steps may be omitted and some steps may be executed at a different time than shown. For example, step 340 may be executed before step 330. Step 550 may be executed before step 540. The point here is to convey that the figures are merely exemplary for the embodiments of the present invention and that other embodiments may be implemented for the present invention.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A system for recording voice over packet (VOP) calls at a premise to perform real-time processing of the VOP calls, comprising:
   a call detailing recording (CDR) device configured in a hospitality environment and controlled by an owner of the hospitality environment, where a set of users uses telephone service and pays for the telephone service;
   the CDR device connected to the set of users at the premise and a VOP network, wherein the CDR device is not a PBX, wherein the premise is the hospitality environment, wherein the CDR device is located between the set of users and the VOP network, and the CDR device is located at the premise, wherein the set of users make VOP calls;
   the CDR device configured to collect information associated with one or more VOP calls made by the set of users, wherein the information is at least a length of a VOP call, a distance between a user of the set of users and a called party, a time of the VOP call, a number called, an originating telephone call number, and a type of VOP call;
   the CDR device configured to generate one or more tariff rates set by the owner of the hospitality environment by generating a tariff rate for each call based on the length of the VOP call, the distance between the user of the set of users and the called party, the time of the VOP call, and the type of VOP call, to store the one or more tariff rates, and to apply the one or more tariffs rates to the one or more VOP calls;
   the CDR device configured to provide one or more billing data generated from the one or more tariff rates applied to the one or more VOP calls to a billing system;
   the CDR device configured to print the one or more billing data about the one or more VOP calls; and
   the CDR device configured to generate one or more bills for telephone charges based on the one or more VOP calls and the one or more tariffs rates.

2. The system of claim 1, wherein the VOP network includes at least one of a telephone switch.

3. The system of claim 2, wherein the CDR device is connected to the VOP network over a COAX connection.

4. The system of claim 1, wherein the one or more tariffs rates are programmable in the CDR device.

5. The system of claim 1, wherein the set of users are located in at least one of a hotel, a motel, or a lodge.

6. One or more non-transitory computer-readable media having instructions stored thereon, wherein all steps are performed by at least one computing device, for performing the system of claim 1.

7. A computer system having a processor and a memory, the computer system configured to execute a method for charging for VOP calls at a premise in a hospitality environment with multiple users, comprising:
   monitoring a set of VOP telephone calls at a computing device controlled by an owner of the hospitality environment, at the premise with a set of users, with a connection to a switch in a VOP network, wherein the computing device is not a PBX, wherein the set of users are located on the premise, where the set of users uses telephone services and pays for the telephone service, and wherein the computing device is located at the premise;
   collecting information associated with one or more VOP telephone calls made by the set of users, wherein the information is at least a length of a VOP telephone call, a distance between a user of the set of users and a called party, a time of the VOP telephone call, a number called, an originating telephone call number, and a type of VOP telephone call;
   generating a set of tariffs at the computing device, set by the owner of the hospitality environment by generating a tariff rate for each call based on the length of the VOP telephone call, the distance between the user of the set of users and the called party, the time of the VOP telephone call, and the type of VOP telephone call;
   storing the set of tariffs at the computing device;
   applying the set of tariffs to the set of VOP telephone calls wherein the set of tariffs are preprogrammed; and
   at the computing device, generating one or more bills for telephone charges based on the one or more VOP calls and the one or more tariffs rates, providing a set of billing data generated from the one or more tariff rates applied to the set of VOP telephone calls to a billing system, and printing the one or more bills about the set of VOP telephone calls.

8. The system of claim 7, wherein the premise is selected from a group including a hotel, a motel, or a lodge.

9. The system of claim 8, wherein the users are selected from a group including guests at the hotel, the motel, or the lodge.

10. The system of claim 7, wherein the calling party is selected from a group including the set of users or guests at a hotel, a motel, or a lodge.

11. One or more non-transitory computer-readable media having instructions stored thereon, wherein all steps are performed by at least one computing device, for performing the system of claim 7.

12. A CDR device configured in a hospitality environment and controlled by an owner of the hospitality environment for collecting a set of call information in a VOP network, comprising:
   a processor, a memory, a storage device, and one or more computer applications operating together in the CDR device located at a premise with a set of users, wherein the CDR device is not a PBX, wherein the premise is a hospitality environment, wherein the CDR device is located between the set of users and the VOP network, wherein the set of users uses telephone services and pays for the telephone service;

the processor and the memory
configured to collect information associated with one or more VOP calls made by the set of users, wherein the information is at least a length of a VOP call, a distance between a user of the set of users and a called party, a time of the VOP call, a number called, an originating telephone call number, and a type of VOP call;
the storage device configured to store the set of call information, other information associated with one or more telephone calls made by the set of users, and a set of telephone charges; and
the one or more computer applications configured to:
generate one or more tariff rates set by the owner of the hospitality environment by generating a tariff rate for each call based on the length of the VOP call, the distance between the user of the set of users and the called party, the time of the VOP call, and the type of VOP call, and to apply the one or more tariffs rates to the one or more VOP calls;
provide one or more billing data generated from the one or more tariff rates applied to the one or more VOP calls to a billing system;
print the one or more billing data about the one or more VOP calls; and
generate one or more bills for telephone charges based on the one or more VOP calls and the one or more tariffs rates.

13. One or more non-transitory computer-readable media having instructions stored thereon, wherein all steps are performed by at least one computing device, for performing the system of claim 12.

* * * * *